C. C. STUTZ.
ROOFING TILE WITH COMPOUND LIGHT PANE.
APPLICATION FILED APR. 11, 1910.

989,440.

Patented Apr. 11, 1911.

WITNESSES

INVENTOR

UNITED STATES PATENT OFFICE.

CHARLES C. STUTZ, OF PLAINFIELD, NEW JERSEY, ASSIGNOR TO AMERICAN CEMENT TILE MANUFACTURING COMPANY, OF WAMPUM, PENNSYLVANIA, A CORPORATION OF PENNSYLVANIA.

ROOFING-TILE WITH COMPOUND LIGHT-PANE.

989,440.      Specification of Letters Patent.      Patented Apr. 11, 1911.

Application filed April 11, 1910. Serial No. 554,727.

*To all whom it may concern:*

Be it known that I, CHARLES C. STUTZ, a resident of Plainfield, Union county, New Jersey, have invented a new and useful Improvement in Roofing-Tiles with Compound Light-Panes, of which the following is a full, clear, and exact description, reference being had to the accompanying drawings, forming part of this specification, in which—

Figure 1:
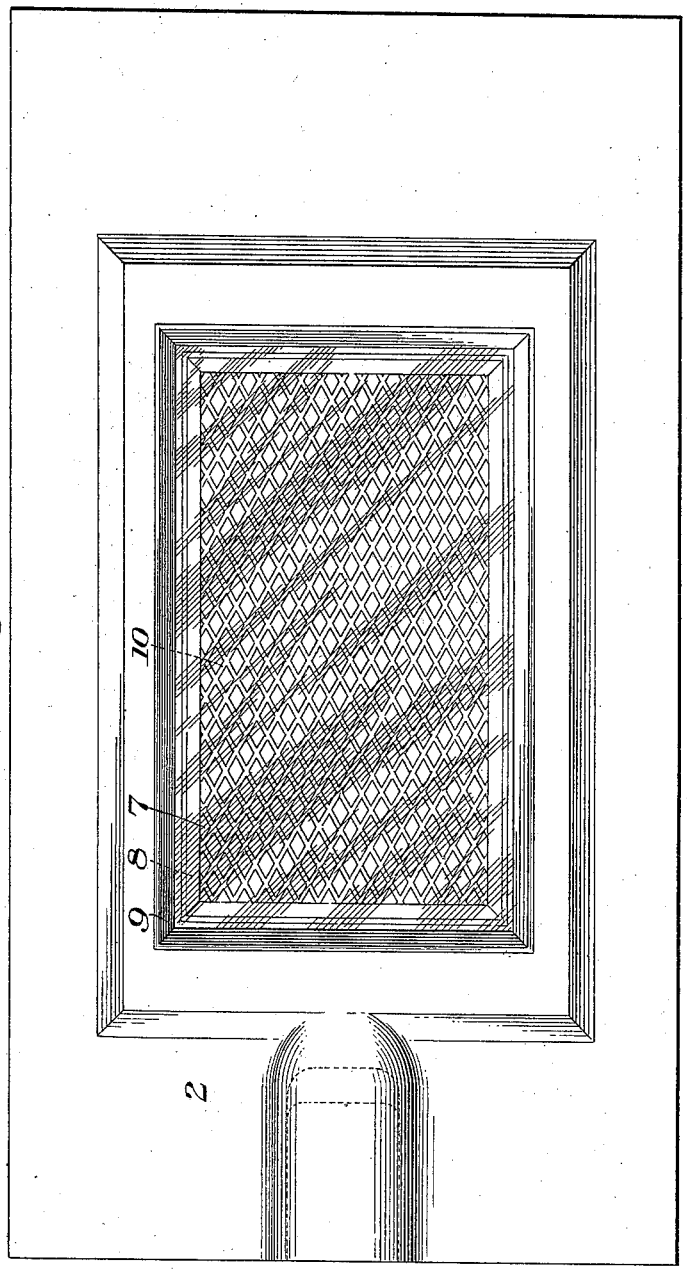
Figure 2:
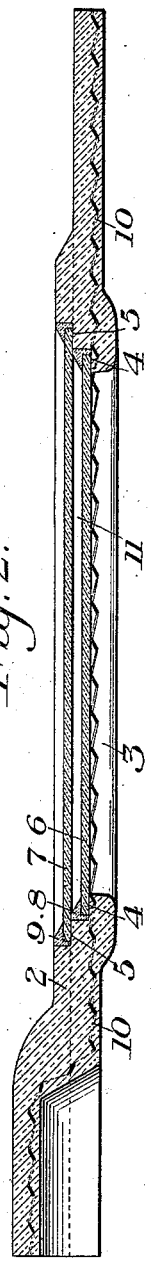

Figure 1 is a plan view of one form of my improved tile. Fig. 2 is a sectional view on the line II—II of Fig. 1.

My invention relates to that class of tiles which contain plates of glass or translucent material.

The object of my invention is to prevent the gathering of moisture on the inner face of the glass, which is caused by the unequal temperatures on the opposite faces thereof. Tiles of this character which have heretofore been made, were provided with a single pane of glass, whose opposite faces were exposed to different temperatures when placed on the building, one face being exposed to the outer air while the other face was exposed to the air beneath the roof. During cold weather the difference in temperature between the outer air and the air within the building below the roof, would cause moisture to gather on the under side of the glass, and run down on the face of the glass until it struck the body of the tile, from which point it dripped to the space below. This dripping of water caused by condensation frequently causes considerable damage to the articles below the roof, and especially where roofs of this character are placed above electrical machines, which are apt to be short circuited, and cause great damage and inconvenience.

The precise nature of my invention will be best understood by reference to the accompanying drawings, which will now be described, it being premised, however, that various changes may be made in the details of construction without departing from the spirit and scope of my invention as defined in the appended claims.

In the drawings the numeral 2 designates a tile, which may be of any approved type, and which may be made from any suitable material, such as clay or cement.

3 is an opening in the center of the tile, 4 and 5 are flanges surrounding the opening 3, and are shown as being stepped, or in different vertical and different horizontal planes. These flanges are arranged to receive the plates of glass 6 and 7, secured thereto by means of cement, as shown at 8 and 9.

10 is a strip of reinforcing material extending throughout the entire tile, and across the opening 2, and as shown in the drawings it extends across the opening immediately below the smaller or inner pane of glass. This reinforcing sheet forms no part of my present invention and may be eliminated, or its shape may be changed to meet the requirements of the specific tile to which my invention may be applied.

In the form of tile shown in the drawings the plate of glass 6 is placed on the flange 4, and is secured in place by means of the cement 8; the plate 7 is then placed on the flange 5, and is secured by means of the cement 9. The distance between the faces of the flanges 4 and 5 should be sufficient to form an intervening air space 11 between adjacent faces of the plates of glass to prevent radiation of heat or cold from one plate of glass to the other; the cement hermetically sealing said space from the outside atmosphere.

The advantages of my invention result from the provision of a tile having a plurality of plates of glass or translucent material with an intervening air space between the adjacent faces of the plates, so that only one face of each plate is exposed to the atmosphere, and thereby avoid sweating, or the collection of moisture on the face of one or both of the plates by the condensation of the atmosphere by the unequal temperatures on the opposite faces of the tile. It will also be understood by those skilled in the art that the plates may be secured in other ways than the one shown in the drawings.

I claim:

1. A roofing tile having an opening therethrough, and a plurality of translucent plates secured in the tile and covering said opening, the opening in the tile being arranged to permit the plates to be inserted from one side of the tile; substantially as described.

2. A roofing tile having a plurality of plates of glass of different area secured in one face thereof, the outer face of one of the plates being exposed to the air on the one side of the tile and one face of another plate being exposed to the air on the opposite face of the tile, and a hermetically sealed space between the plates; substantially as described.

3. A roofing tile having an opening therethrough, a plurality of seats surrounding said opening, a plate of translucent material secured on each of said seats, the opening in said tile being arranged to permit the plates to be inserted on the seats from one side of the tile; substantially as described.

4. A roofing tile having an opening therethrough, a plurality of flanges in different horizontal and vertical planes surrounding the opening, a translucent plate supported on each of the flanges, the opening in the tile being arranged to permit the plates to be inserted from the same side of the tile, the plates being spaced apart to form an air space between adjacent sides of the plates, and means to secure the plates in the tile to hermetically seal said space; substantially as described.

5. A roofing tile having an orifice therethrough, a plurality of flanges surrounding the opening, a translucent plate supported on each of the flanges, the flanges being arranged to receive the plates from the same side of the tile, the plates being spaced apart to form an air space between adjacent sides of the plates, and cement surrounding the edges of the plate to secure the plates in the tile to hermetically seal said space; substantially as described.

In testimony whereof, I have hereunto set my hand.

CHARLES C. STUTZ.

Witnesses:
R. J. FISHER,
CORNELIUS REGAN.

Copies of this patent may be obtained for five cents each, by addressing the "Commissioner of Patents, Washington, D. C."